US006978965B1

(12) United States Patent  (10) Patent No.: US 6,978,965 B1
Hartmann et al.  (45) Date of Patent: Dec. 27, 2005

(54) SEEKER FOR TARGET-TRACKING MISSILES

(75) Inventors: Ulrich Hartmann, Uhldingen (DE); Jürgen Schnatz, Überlingen (DE); Hartmut Goseberg, Überlingen (DE)

(73) Assignee: Bodenseewerk Gerätetechnik GmbH, Überlingen (DE)

( * ) Notice: Subject to any disclaimer, the term of this patent is extended or adjusted under 35 U.S.C. 154(b) by 1826 days.

(21) Appl. No.: 08/309,343

(22) Filed: Sep. 8, 1994

(30) Foreign Application Priority Data

Sep. 15, 1993 (DE) .......................................... 43 31 259

(51) Int. Cl.⁷ .............................................. F41G 7/26
(52) U.S. Cl. ..................................................... 244/3.16
(58) Field of Search ............................... 244/3.16, 3.15

(56) References Cited

U.S. PATENT DOCUMENTS

| | | | | |
|---|---|---|---|---|
| 4,288,050 A | * | 9/1981 | Gauggel | 244/3.16 |
| 4,494,202 A | * | 1/1985 | Yueh | 244/3.15 |
| 4,508,293 A | * | 4/1985 | Jones | 244/3.15 |
| 4,576,346 A | * | 3/1986 | Gauggel et al. | 244/3.16 |
| 4,823,626 A | * | 4/1989 | Hartmann et al. | 74/5.34 |
| 5,077,465 A | * | 12/1991 | Wagner et al. | 244/3.16 |
| 5,253,823 A | * | 10/1993 | Lawrence | 244/3.15 |
| 5,262,630 A | * | 11/1993 | Kordulla | 244/3.16 |
| 5,323,987 A | * | 6/1994 | Pinson | 244/3.16 |

FOREIGN PATENT DOCUMENTS

| | | | | |
|---|---|---|---|---|
| DE | 4223531 | * | 1/1994 | 244/3.16 |
| FR | 2668614 | * | 4/1992 | 244/3.16 |

* cited by examiner

Primary Examiner—Charles T. Jordan
(74) Attorney, Agent, or Firm—Crowell & Moring LLP

(57) ABSTRACT

A target tracking device for target tracking missiles having an electro-optical seeker assembly mounted in a missile structure through gimbals. The seeker assembly responds to target radiation and provides target deviation signals. Actuators, controlled by the target deviation signals, cause the seeker assembly to track the target. The electro-optical seeker assembly is pivotally mounted in the missile structure about a roll axis and a pitch axis only, the pitch axis being orthogonal to the roll axis. First and second pick-offs, providing pick-off signals, are provided for picking off angles of rotation of the seeker assembly about the roll and pitch axes. A structure-fixed inertial sensor unit is provided for measuring the angular rates about three mutually orthogonal axes and providing angular rate signals. The target deviation signals from the seeker assembly, the pick-off signals from the pick-offs and the angular rate signals from the inertial sensor unit are applied to a computer, which is programmed to define a seeker reference system with three degrees of freedom. This seeker reference system is decoupled from movements of the missile and the seeker assembly. The roll movement of the seeker reference system is zero. The seeker reference system is caused to track a target detected by the seeker assembly. The computer, in addition, generates positioning commands for the actuators depending on the position of the seeker reference system. The device for generating the positioning command is a case discriminating logic for selecting one of a plurality of specific positioning commands, when the target approaches the roll axis.

3 Claims, 6 Drawing Sheets

SEEKER FOR TARGET-TRACKING MISSILES

BACKGROUND OF THE INVENTION

The invention relates to a target tracking device for target tracking missiles comprising an electro-optical seeker assembly mounted in a missile structure through gimbals, said seeker assembly responding to target radiation and providing target deviation signals, and actuator means for causing said seeker assembly to track a target, said actuator means being controlled by target deviation signals.

Target tracking missiles contain a seeker with a seeker assembly, which receives radiation from a target and is caused to point towards the target. The seeker assembly comprises an imaging optical system. The imaging optical system generates an image of an object scene in an image plane. Detector means generate target deviation signals. Actuator means are controlled by these target deviation signals. The actuator means keep the seeker assembly aligned with or pointing to the target. In addition, steering commands are generated, which steer the missile to the target.

The seeker assembly has to be stabilized and de-coupled from the movements of the missile. In prior art target tracking missiles, the imaging optical system is carried by a gimbal mounted gyro rotor. This gyro rotor is stabilized in space and de-coupled from the missile movements. The imaging optical system comprises a concave mirror, the optical axis of which forms a small angle with the axis of rotation of the gyro rotor. Thereby, the image of the object scene makes a gyrating movement in the image plane. A reticle or modulating disc is located in the image plane. A photoelectric detector is arranged behind the reticle. A. C. signals are derived from the signals of the photoelectric detector. The amplitude of these A. C. signals depends on, the amount of the target deviation, and the phase of these A. C. signals depends on the direction of the target deviation. These signals are applied to precession coils, which surround the gyro rotor. The gyro rotor is radially magnetized. Thereby, cyclic precession torques are exerted on the gyro rotor. These precession torques cause precession of the axis of rotation of the gyro rotor towards a detected target. In prior art missiles, these A. C. signals, at the same time, serve to generate steering signals for the missile.

In these prior art devices, the "angle of squint", i.e. the angle between the axis of rotation of the gyro rotor and the longitudinal axis of the missile is limited.

Picture processing seeker assemblies are known. In such picture processing seeker assembies, a two-dimensional array of detector elements is provided in the image plane of the imaging optical system, similar to a video camera. The detector elements respond to infrared radiation. A target is recognized and a target deviation is determined by picture processing.

For highly maneuverable missiles, target tracking devices or seeker heads are required which permit large angles of squint. The space required by the device and the the weight of the device should be low.

SUMMARY OF THE INVENTION

It is an object of the invention to provide a target tracking device or seeker head for a target tracking missile which, with low space required and low weight, permits a large angle of squint.

Now in order to implement these and still further objects of the invention, which will become more readily apparent as the description proceeds, the target tracking device of the present development is manifested by the features that, among other things (a) said electro-optical seeker assembly is pivotally mounted in said missile structure about a roll axis and a pitch axis only, said pitch axis being orthogonal to said roll axis, (b) first and second pick-off means are provided for picking off angles of rotation of said seeker assembly about said roll and pitch axes, said first and second pick-off means providing pick-off signals, (c) structure-fixed inertial sensor means are provided for measuring the angular rates about three mutually orthogonal axes and providing angular rate signals, (d) said target deviation signals from said seeker assembly, said pick-off signals from said pick-off means and said angular rate signals from said inertial sensor means are appied to a computer, which is programmed to define a seeker reference system with three degrees of freedom
  which is de-coupled from movements of the missile and the seeker assembly,
  the roll movement of which is zero, and
  which is caused to track a target detected by said seeker assembly, (e) said computer, in addition, has means for generating positioning commands for said actuator means depending on the position of said seeker reference system.

Thus the seeker assembly is not mounted on a gyro rotor but is adjustable by actuator means about two gimbal axes, namely the roll and pitch axes. By providing only two gimbal axes, the gimbal assembly becomes rather simple, lightweight and space saving. By means of the inertial sensor means, for example two dynamically tuned gyros arranged crosswise and providing a total of four input axes, the movement of the missile relative to the inertial space is measured. A reference system is defined by computation from the target deviation angles provided by the seeker assembly, the gimbal angles provided by the pick-off means, and the movements of the missile relative to inertial space measured by the inertial sensor means. This reference system is de-coupled from the pitch-, yaw- and roll-movements of the missile. The x-axis in this reference system passes through the target and continously follows the target. The roll rate of the reference system is zero. The seeker assembly is aligned with this x-axis. Steering commands are derived from the movements of the reference system in inertial space.

If the seeker assembly is movable about two gimbal axes only, there will be a singularity, when the target closely passes by the roll axis. If the target lies on the roll axis, the orientation of the seeker assembly about the roll axis becomes completely indefinite. When the target passes closely by the roll axis, extremely high control rates would be required to track the target exactly.

According to a further aspect of the invention, said means for generating said positioning command comprise case discriminating logic means for selecting one of a plurality of specific positioning commands, when the target approaches said roll axis.

Then the positioning commands for movement about the roll axis can be adapted to the respective requirements, when the target approaches the roll axis, whereby no gimbal rates are commanded which cannot be achieved by the actuator means. Thereby, in turn, loss of the target due to insufficient gimbal rates is avoided. To this end, preferably (a) a first signal, which represents the absolute amount of the angular rate of the target relative to the missile, a second signal, which represents the pitch angle, and a third signal, which represents the target deviation, are applied to said case discriminating logic means, (b) said phase discriminating logic means are arranged to combine said first, second and third signals such that the positioning command about said roll axis is limited only by the maximum control rate of said actuator means, if
said pitch angle exceeds an upper threshold
said pitch angle is larger than a lower threshold but smaller than said upper threshold and said absolute amount of the relative angular rate is larger than an angular rate threshold, or
said target deviation is larger than an upper target deviation threshold,
said positioning command about said roll axis commands a control rate of zero, if
said pitch angle is smaller than said lower pitch angle threshold,
said pitch angle is larger than said lower pitch angle threshold and smaller than said upper pitch angle threshold, said absolute amount of the relative angular rate is smaller than said angular rate threshold, and the absolute amount of said target deviation is smaller than a lower target deviation threshold, and
said positioning command about said roll axis increases as a function of said target deviation progressively within the range between said lower and upper target deviation thresholds, if
said absolute amount of the relative angular rate is smaller than the angular rate threshold, and the absolute amount of the target deviation lies between said lower and upper target deviation thresholds.

The follow-up movement of the seeker assembly about the roll axis is effected in the conventional way, if the gimbal angle of the pitch axis exceeds an upper threshold of, for example, 5°, the positioning command being limited by the maximum control rate of the actuator means only. In this case, the target is sufficiently spaced from the roll axis, thus is located outside the singularity. If the gimbal angle of the pitch axis lies between the upper threshold and a lower threshold, the logic will examine, whether the target moves fast or slowly relative to the missile. In the case of a fast movement, if the absolute amount of the relative angular rate is larger than the threshold, the follow-up has to be effected in the conventional way. The same is true in the case of large target deviation in the field of view of the seeker assembly. This counteracts loss of the target.

If, however, the gimbal angle of the pitch axis is smaller than a lower threshold of, for example, 0.05°, thus if the target is closely adjacent the roll axis, it will be preferable to keep the roll angle unchanged. Then the risk of target loss, i.e. the risk that the target will move out of the field of view of the seeker assembly is low. The roll angle is also left unchanged, if the gimbal angle of the pitch axis is larger than the lower threshold but smaller than the upper threshold, the absolute amount of the relative angular rate is small, and also the target deviation is small. In this case, the target lies substantially in the center of the field of view of the seeker assembly. The target moves relatively slow relative to the missile. The gimbal angle of the pitch angle lies in a median range. Also in this case, the risk of target loss is low.

If, eventually, the gimbal angle of the pitch axis lies in the median range between the thresholds, the relative angular rate is small and also the target deviation lies between the upper threshold and the lower threshold, a positioning command for the movement about the roll axis is generated which in the range from the lower target deviation threshold to the upper target deviation threshold is a progressive function of target deviation. The function increases from zero to the maximum control rate of the actuator means.

BRIEF DESCRIPTION OF THE DRAWINGS

An embodiment of the invention is described hereinbelow with reference to the accompanying drawings.

DETAILED DESCRIPTION OF THE PREFERRED EMBODIMENT

Describing now the drawings, it is to be understood that only enough of the construction of the target tracking device has been shown as needed for those skilled in the art to readily understand the underlying principles and concepts of the present development, while simplifying the showing of the drawings.

Figure 1:
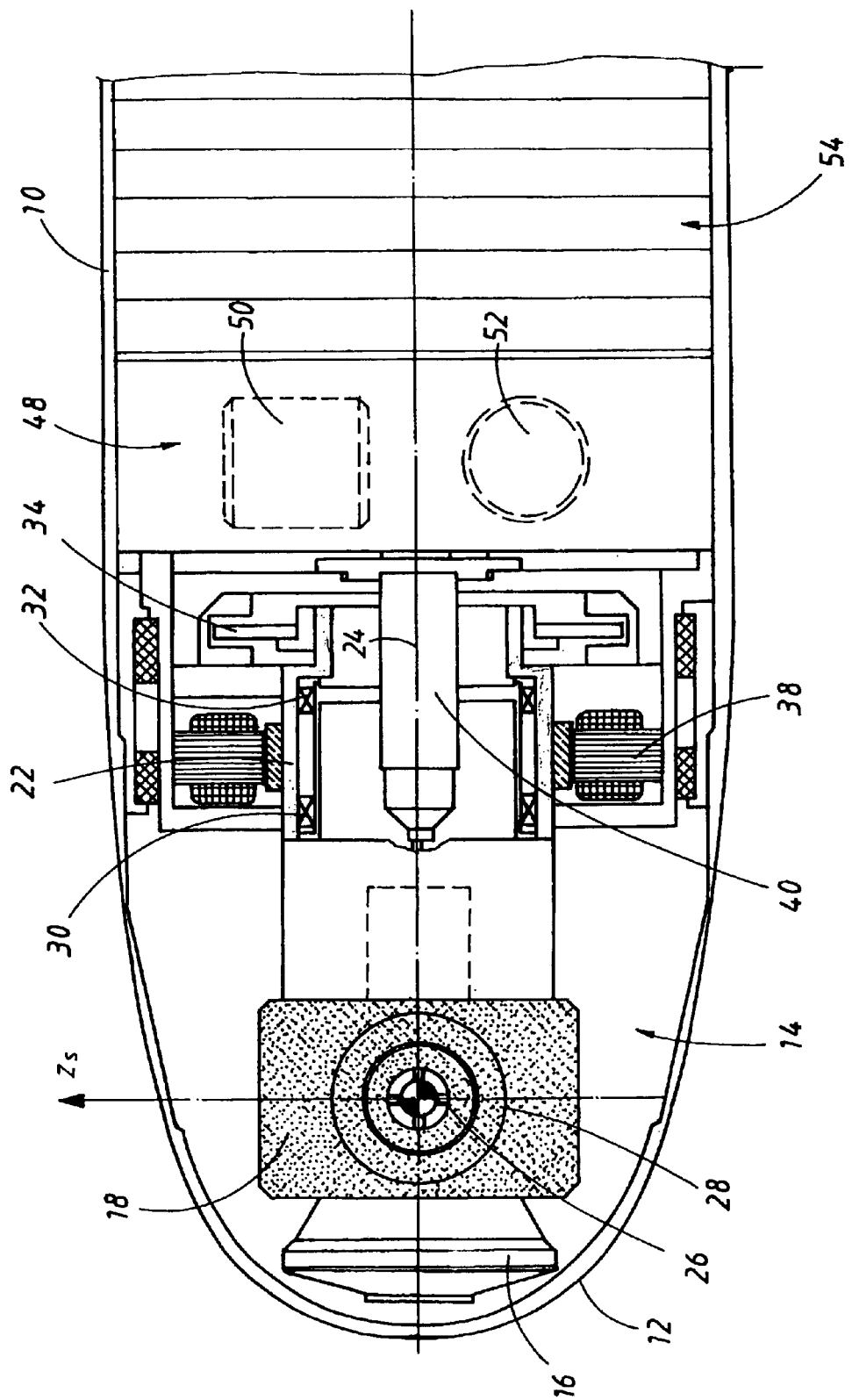
FIG. 1 is a longitudinal sectional view of the tip of a missile with an infrared-sensitive seeker head.
Figure 2:
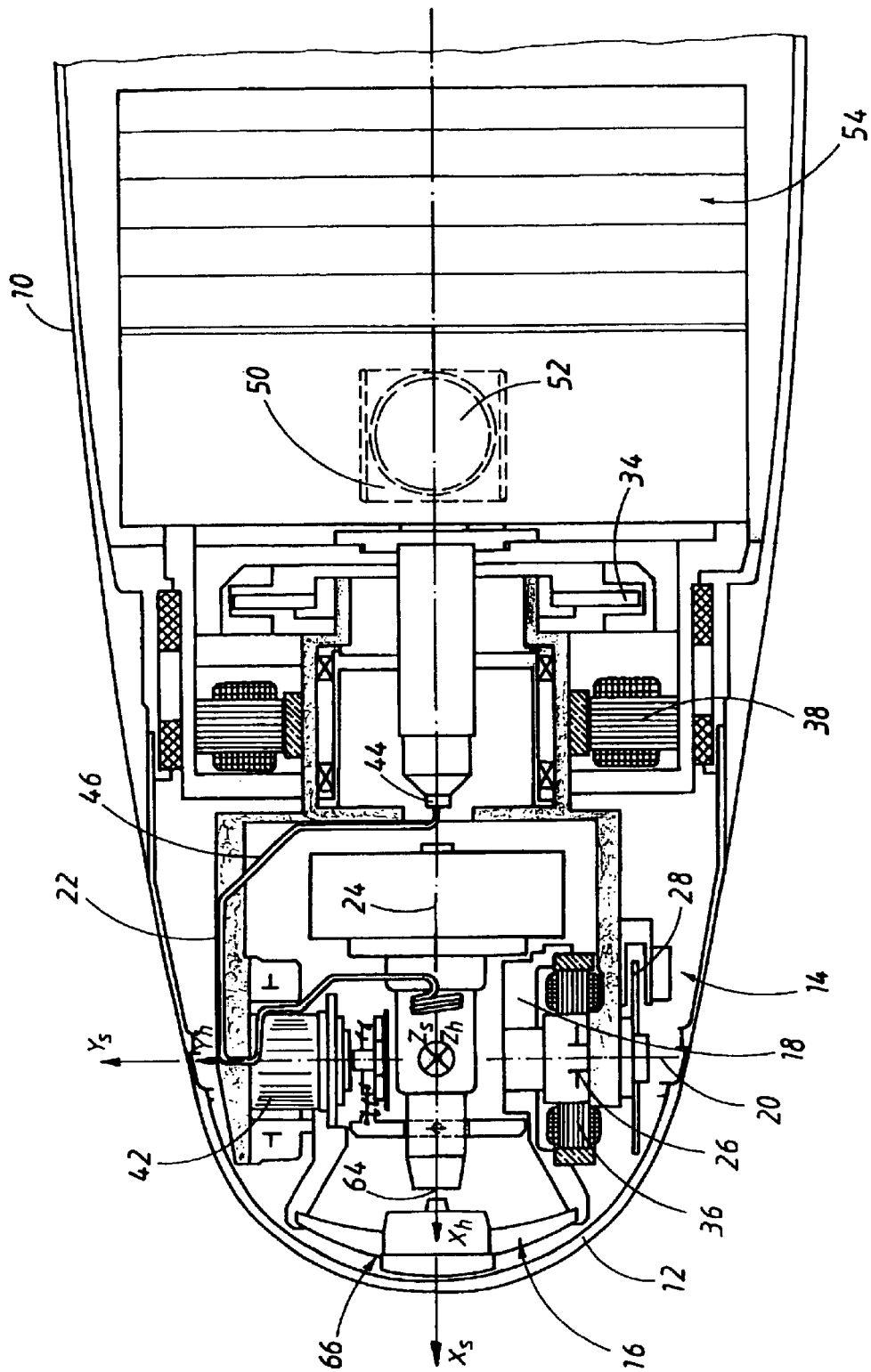
FIG. 2 is a longitudinal sectional view of the tip of the missile of FIG. 1 taken perpendicular to the plane of the paper of FIG. 1.

Referring to FIGS. 1 and 2, numeral 10 designates the structure of a missile. A dome 12 transparent to infrared radiation is provided at the tip of the missile. A seeker head 14 with a seeker assembly 16 is mounted behind the dome 12. The seeker assembly 16 is mounted in a pitch gimbal 18. The pitch gimbal 18 is pivoted about a pitch axis 20 relative to a roll gimbal 22. The roll gimbal 22 is pivoted about a roll axis 24 relative to the structure 10 of the missile. The pitch gimbal 18 is mounted in the roll gimbal 22 in pitch gimbal bearings 26. The pitch gimbal angle is picked off by a digital pitch gimbal pick-off 28. The roll gimbal 22 is mounted in roll gimbal bearings 30,32 (FIG. 1). The roll gimbal angle is picked off by a roll gimbal pick-off 34. The pitch gimbal 18 is rotatable by a pitch gimbal actuator (torquer) 36. The roll gimbal 22 is rotatable by a roll gimbal actuator 38. Numeral 40 designates a slip ring assembly. The slip ring assembly transfers signals from the rotatable roll gimbal 22 to a structure-fixed signal processing unit and supply voltages from a structure-fixed source to the roll gimbal 22. Signals and supply voltages are transferred between the roll gimbal 22 and the pitch gimbal 18 through a slip ring assembly 42. A rotary coupling 44 and a pipe 46 transfer coolant from a structure-fixed coolant reservoir to a cooler arranged in the seeker assembly. The cooler cools a picture sensor in the seeker assembly 16. This is well-known technology and, therefore, is not described in detail.

An inertial sensor means or unit 48 is mounted structure-fixed in the missile. In the illustrated embodiment, the inertial sensor unit consists of two dynamically tuned gyros 50 and 52. The spin axes of the gyros 50 and 52 are arranged crosswise. Each of the dynamically tuned gyros 50 and 52 is, in well-known manner, a two-axis gyro having two mutually orthogonal input axes, which are also orthogonal to the spin axis. The inertial sensor unit 48 provides angular rates of the missile about three mutually orthogonal axes.

Furthermore, the missile contains the electronic system 54 for processing the data.

Figure 3:
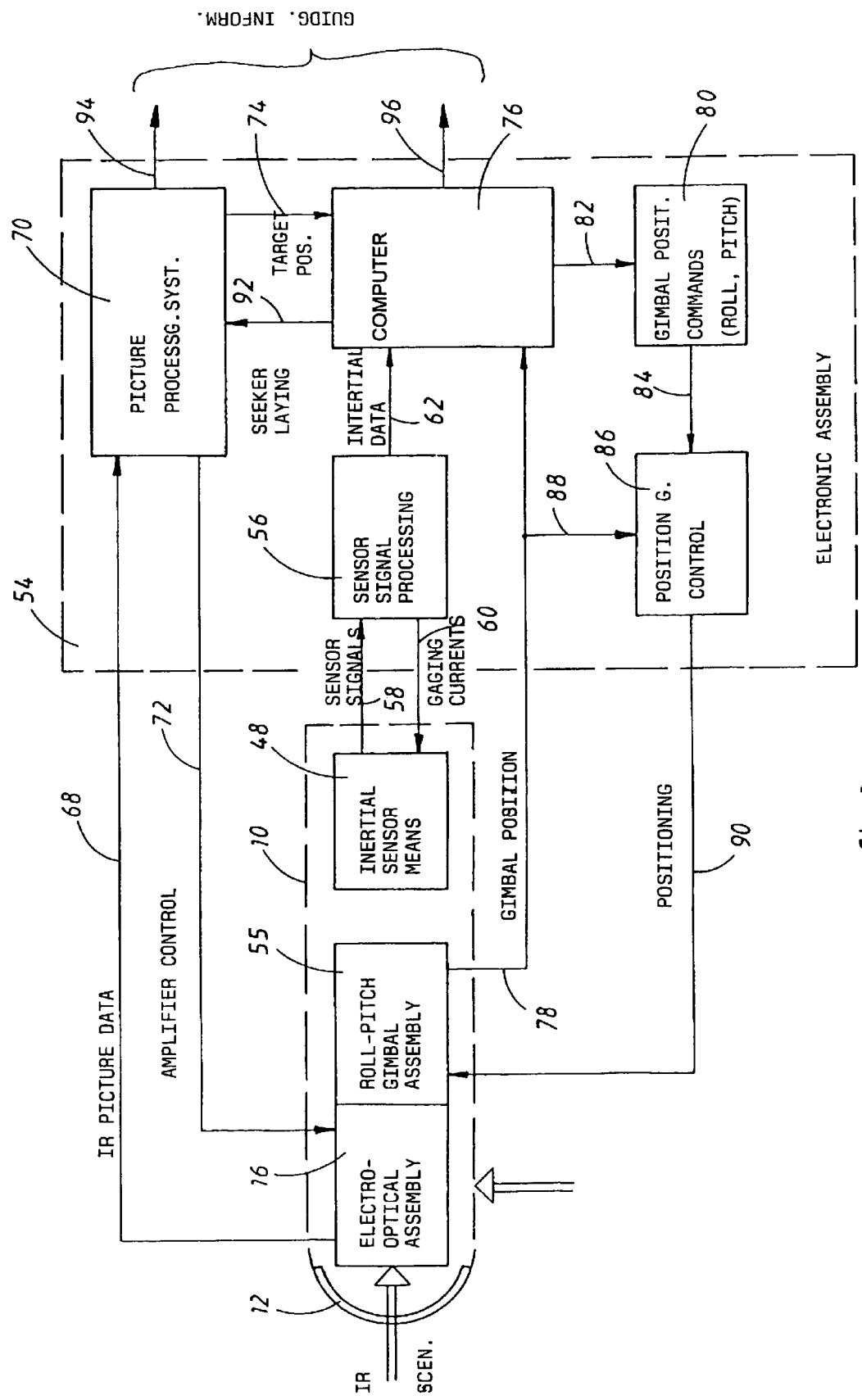
FIG. 3 is an operational diagram of the seeker head.

FIG. 3 is an operational diagram of the seeker head.

The electro-optical seeker assembly 16 is mounted in the roll-pitch gimbal assembly 55 with the roll gimbal 22 and the pitch gimbal 18.

The inertial sensor unit 48 is illustrated as a block in FIG. 3. The inertial sensor unit 48 supplies sensor signals to a sensor signal processing system 56. This is illustrated by the connection 58. The sensor signal processing system 56 supplies caging currents to the inertial sensor unit 48. This is illustrated by the connection 60. The inertial sensor unit 48 and the sensor processing system may cooperate substantially as shown in U.S. Pat. No. 4,823,626, the disclosure of which is incorporated herein by reference. The sensor signal processing system 56 provides inertial data at an output 62.

The roll-pitch gimbal assembly 55 provides the gimbal position in the form of gimbal angles at the pitch gimbal pick-off 28 and the roll gimbal pick-off 34.

The electro-optical seeker assembly 16 comprises a cooled, infrared-sensitive picture sensor 64 and an imaging optical system 66. The picture sensor 64 comprises a two-dimensional array of infrared-sensitive detector elements. The optical system generates an infrared image of an object scene on the picture sensor 64. The picture sensor 64 covers a certain field of view of the object scene. Picture data of the picture sensor 64 are applied to a picture processing system 70 through a connection 68. The picture processing system 70, in turn, provides control signals for the gain control of the picture sensor 64 to the electro-optical seeker assembly 16. This is illustrated by the connection 72. The picture processing system 70 provides, at an output 74, the target position in the field of view of the electro-optical seeker assembly 16, i.e. the target deviation from a reference point in this field of view.

A computer 76 is represented by a block. This computer 76 receives the inertial data from the sensor signal processing system 56 at the output 62 thereof, the gimbal positions from the pitch gimbal pick-off 28 and the roll gimbal pick-off 34, which are represented in FIG. 3 by an output 78, and the target position or target deviation from output 74 of the picture processing system.

The computer 76 computes from the supplied data a seeker reference system, which is inertially stabilized, thus is de-coupled from the movements of the missile and of the seeker assembly. One axis, the x-axis, is caused to follow the target. The inertial roll rate of the reference system is zero. Numeral 80 designates a circuit for generating gimbal positioning commands for positioning the gimbals, thus for controlling the actuators 36 and 38. The circuit 80 receives data from the computer 76 through the output 82 thereof. The circuit 80 supplies the gimbal positioning commands through an output 84 as command variable to a positioning controller 86. In addition, the positioning controller 86 receives actual values of the gimbal angles as gimbal position from the output 78 of the roll-pitch gimbal assembly 55 through an input 88. The positioning controller 86 supplies manipulated variable signals through a connection 90 to actuators (torquers) 36 and 38 of the pitch-roll gimbal arrangement to generate positioning torques.

Steering information for steering the missile are provided at an output 94 of the picture processing system and an output 96 of the computer 76.

The missile moves in inertial space. During this movement, the missile can make pitch, yaw and roll movements relative to inertial space. In the described device, various coordinate systems are defined. An inertial coordinate system is space-fixed with respect to inertial space, at least as far as the direction of the coordinate axes is concerned. This coordinate system is characterized by an index "i".

A second coordinate system is missile-fixed (or seeker head-fixed). The coordinate origin of the missile-fixed coordinate system is located at the intersection of the roll and pitch axes 24 and 20, respectively, of the seeker head 14. The missile-fixed or seeker head-fixed coordinate system is characterized by an index "s". The $x_s$-axis extends in the direction of the longitudinal axis of the missile. This longitudinal axis coincides with the roll axis. The $y_s$-axis extends orthogonal thereto in the plane of the paper upwards in FIG. 2. The $z_s$-axis is orthogonal to the two other axes and normal to the plane of the paper of FIG. 2.

A third coordinate system is fixed with respect to the opto-electronic seeker assembly 16. The coordinate system is characterized by an index "h". The $x_h$-axis extends along the optical axis of the imaging optical system and through the center of the picture sensor 64. Thus this $x_h$-axis represents the center of the field of view observed by the seeker assembly 16. The $y_h$-axis coincides with the pitch axis 20, about which the pitch gimbal is mounted in the roll gimbal. The $z_h$-axis is orthogonal to the two other axes. In the illustration of FIG. 2, the seeker assembly 16 "looks" exactly straight forward. Then the "s"- and "h"-coordinate systems coincide. If, however, the roll gimbal 22 is rotated out of the illustrated position about the roll axis 24, then the $y_s$-axis and the $y_h$-axis form an angle. Similarly, the $z_s$-axis and the $z_h$-axis form an angle. The coordinate origin of the h-coordinate system is located also at the intersection of the pitch and roll axes 20 and 22, respectively.

A fourth coordinate system is the seeker reference system already mentioned. This seeker reference system is characterized by an index "r". The coordinate origin of the seeker reference system again coincides with the intersection of the pitch and roll axes 20 and 24, respectively. The $x_r$-axis is caused to follow the target. It passes through the target. The $y_r$-axis and the $z_r$-axis are mutually orthogonal and orthogonal to the $x_r$-axis. The seeker reference system is inertially stabilized and de-coupled from the movements of the missile, thus of the s-coordinate system, and of the seeker assembly 16, thus of the h-coordinate system. The inertial roll rate of the seeker reference system, thus the angular rate of the seeker reference system about the $x_s$-axis in the inertial coordinate system is zero.

At first, the target position is measured by means of the seeker assembly 16 in the h-coordinate system. The angular rates of the missile are measured by the gyros 50 and 52 in the missile-fix the s-coordinate system. The coordinate transformation between the coordinate systems are effected by means of directional cosine matrices. A directional cosine matrix is a matrix with which a vector defined with components in one coordinate system has to be multiplied, in order to obtain the components of the vector in another coordinate system which is rotated relative to the first system. The elements of the matrix are trigonometric functions of the angles of rotation of the other coordinate system relative to the first coordinate system. Herein, these directional cosine matrices are designated by "C" with a lower index and an upper index. The indices indicate, between which coordinate systems the coordinate transformation is effected.

Figure 4:
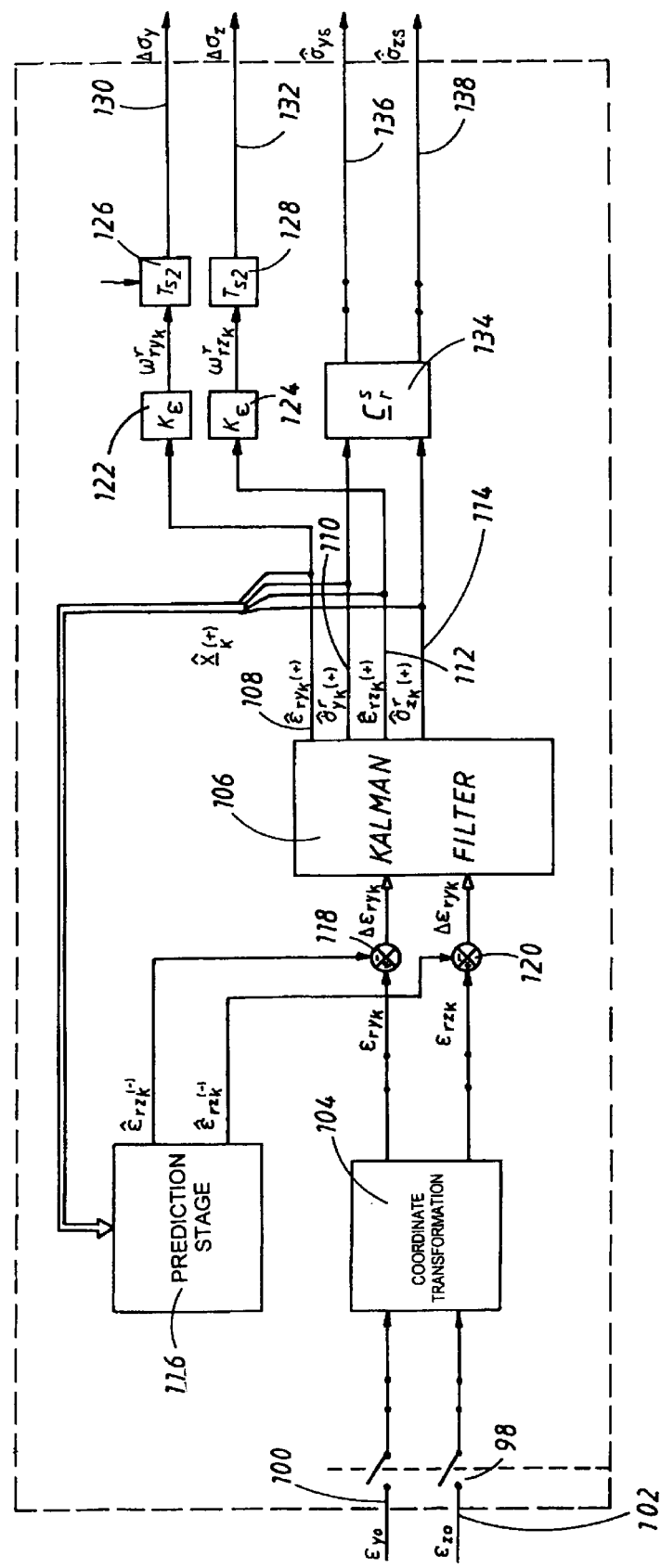
FIG. 4 i an operational diagram of the follow-up loop, by which the seeker reference system, by means of picture processing, is caused to follow the target.

FIG. 4 illustrates the follow-up loop which causes the computed reference coordinate system (r) to follow the target. The follow-up loop receives at inputs 100 and 102 the target coordinates $\epsilon_{yo}$ and $\epsilon_{zo}$ from the picture processing system 70 (FIG. 3) in the h-corrdinate system of the seeker assembly 16. The target coordinates are sampled with a sampling frequency adapted to the requirements of the system. This is indicated by the switches 98. The target coordinates $\epsilon_{yo}$ and $\epsilon_{zo}$ are transformed into the seeker reference system. This is done by means of a directional cosine matrix $C_h^r$ for the transformation from the h-coordinate system into the r-coordinate system. The directional cosine matrix $C_h^r$ is obtained as the product of the directional cosine matrix $C_s^r$ for the transformation from the missile-fixed s-coordinate system into the seeker reference systen (r) and the directional cosine matrix $C_h^s$ for the transformation from the h-coordinate system of the seeker assembly into the missile-fixed h-coordinate system. This transformation is illustrated in FIG. 4 by a block 104. The line of sight unity vector determined in the h-coordinate system by the picture processing system is transformed by the transformation into the seeker reference system (r).

Numeral 106 designates a fourth-order Kalman filter. The Kalman filter 106 provides as state vector at the outputs 108, 110, 112 and 114 estimated values for the target position and the line of sight angular rate. From the estimated values of the target position and the estimated values of the line of sight angular rate obtained in one clock interval a prediction stage 116 provides estimated values of a predicted target position in the next-following clock interval. These predicted estimated values are compared at summing points 118 and 120 to the target positions measured and transformed in the next-following clock interval. The differences of the components represent the inputs to the Kalman filter.

The Kalman filter 106 provides estimated values of the target position in the seeker reference system. These estimated values represent the error signals of a follow-up control loop, by which the seeker reference system is caused to follow the target. The error signals provide, with the loop gain K represented by blocks 122 and 124, angular rates of the seeker reference system about its pitch and yaw axes y and z, respectively. When the angular rates are sampled and applied in fixed time intervals, as represented by blocks 126 and 128, angle increments $\Delta\sigma_y$ and $\Delta\sigma_z$ result at the outputs 130 and 132, respectively.

In addition, the Kalman filter 106 provides estimated values of the angular rates $\dot{\sigma}_y^r$ and $\dot{\sigma}_z^r$ in the seeker reference system (r). A directional cosine matrix $C_r^s$ represented by block 134 serves to transform these angular rates into the missile-fixed s-coordinate system. These angular rates $\dot{\sigma}_y^s$ and $\dot{\sigma}_z^s$ are available at outputs 136 and 138, respectively.

Figure 5:
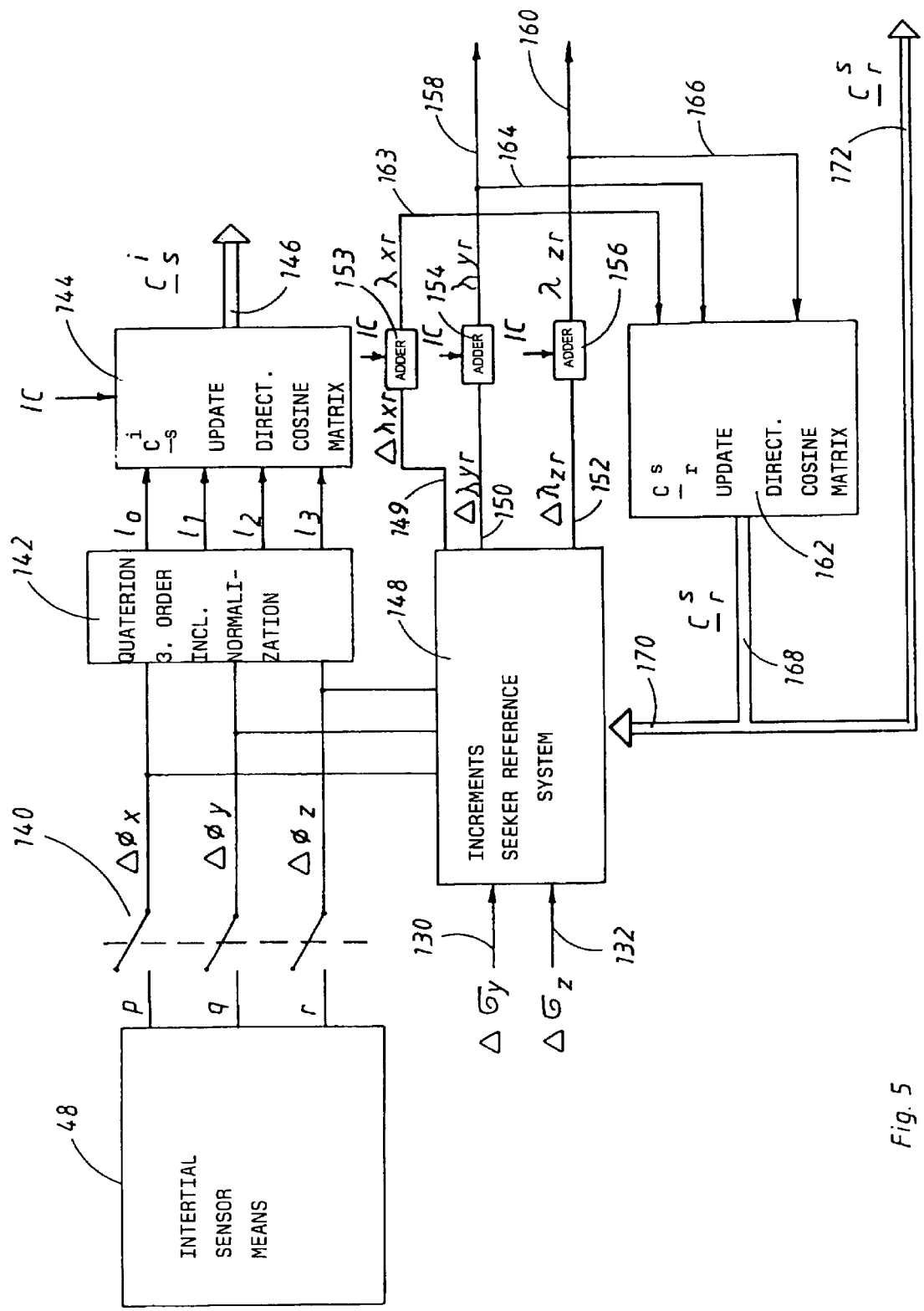
FIG. 5 is an operational diagram and illustrates the determining of the directional cosine matrices from the gyro signals.

FIG. 5 is an operational diagram and illustrates the determination of the directional cosine matrices from the gyro signals.

The inertial sensor unit 48 provides angular rates p, q and r about three mutually orthogonal axes. The angular rates of the missile about these three axes are sampled at a rather high sampling rate adapted to the dynamic requirements of the missile dynamics. This is illustrated by switch 140 in FIG. 5. Angle increments $\Delta\Phi_x$, $\Delta\Phi_y$ and $\Delta\Phi_z$ are obtained therefrom. The angle increments are applied to a circuit 142 for forming a third-order quaternion (including scaling). The circuit 142 provides four quantities $l_0$, $l_1$, $l_2$, and $l_3$. These quantities serve to update the directional cosine matrix $C_s^i$ for the transformation of vectors from the missile-fixed s-coordinate system into the inertial coordinate system (i). This is symbolized by a block 144. The block 144 provides the directional cosine matrix $C_s^i$ at an output 146.

The angle increments $\Delta\Phi_x$, $\Delta\Phi_y$ and $\Delta\Phi_z$ are applied to a functional block 148. Functional block 148, in addition, receives angle increments from the outputs 130 and 132 of the follow-up control loop (FIG. 4) moving the seeker reference system (r). Block 148 generates therefrom, at outputs 149, 150 and 152, increments $\Delta\lambda_{xr}$, $\Delta\lambda_{yr}$ and $\Delta\lambda_{zr}$ of the "gimbal angles" between the seeker reference system and the missile. These increments are summed up by adders 153, 154 and 156, respectively, and provide gimbal angles $\lambda_{xr}$, $\lambda_{yr}$ and $\lambda_{zr}$, respectively. The two gimbal angles $\lambda_{yr}$ and $\lambda_{zr}$ are available at outputs 158 and 160, respectively.

Furthermore, the gimbal angles $\lambda_{xr}$, $\lambda_{yr}$ and $\lambda_{zr}$ are applied to a functional block 162, as has been illustrated by connections 163, 164 and 166. The functional block 162 causes updating of the directional cosine matrix $C_r^s$ for the transformation of a vector from the seeker reference system (r) into the missile-fixed s-coordinate system. The functional block 162 provides this directional cosine matrix $C_r^s$ at an output 168. On one hand, the directional cosine matrix $C_r^s$ is applied to the functional block 148 through an input 170. On the other hand, the directional cosine matrix $C_r^s$ is available at an output 172.

Figure 6:
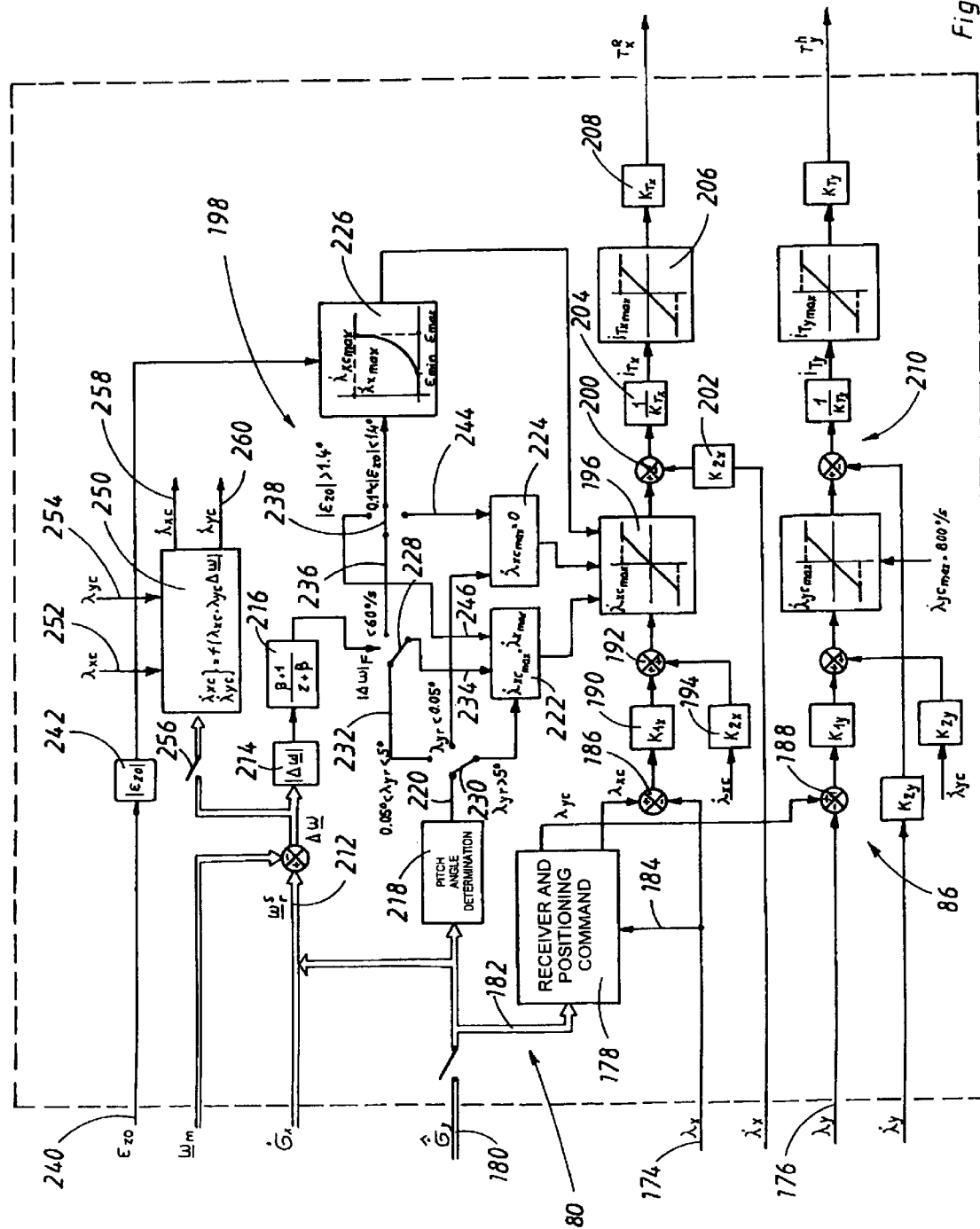
FIG. 6 illustrates the control loop of the angle of squint and a logic circuit for limiting the commands in the region of the "gimbal lock".

FIG. 6 illustrates the control loop for the "angle of squint" and a logic for limiting the positioning commands in the region of the "gimbal lock". The operational diagram of FIG. 6 corresponds to the circuit 80 and the positioning controller 86 of FIG. 3.

The positioning controller 86 of FIG. 6 receives the roll angle $\lambda_x$ of the roll gimbal 22 from the roll gimbal pick-off 34 and the pitch angle $\lambda_y$ of the pitch gimbal from the pitch gimbal pick-off 28. These gimbal angles are applied to inputs 174 and 176, respectively, of the operational diagram of FIG. 6.

A functional block 178 receives once, through an input 180 and a connection 182, the directional cosine matrix $C_r^s$ for the transformation from the seeker reference system into the missile-fixed s-coordinate system. This directional cosine matrix $C_r^s$ is obtained at the output 172 of FIG. 5. In addition, the functional block 178 receives, through an input 184, the roll angle of the roll gimbal 22 as actually measured by the roll gimbal pick-off 34. From these data, the functional block 178 determines positioning commands or command variables $\lambda_{yc}$ or $\lambda_{xc}$ for the gimbal angles $\lambda_y$ and $\lambda_x$. These positioning commands command such positions of the gimbals that the $x_r$-axis and, thereby, the seeker assembly are aligned to point to the target. The positioning command or the command variable $\lambda_{xc}$, which is provided by the functional block 178, is compared with the actual roll angle $\lambda_x$, which is measured by the roll gimbal pick-off 34, at a summing point 186. The positioning command or the command variable $\lambda_{yc}$ which is provided by the functional block 178, is compared with the actual pitch angle $\lambda_y$, which is measured by the pitch angle pick-off 28, at a summing point 188.

The error is multiplied by a factor $K_{1x}$. This is illustrated by block 190. A commanded time derivative $\dot{\lambda}_{xc}$ of the roll angle $\lambda_x$ multiplied by a factor $K_{2x}$ is superimposed, at a summing point 192, to the thus multiplied error. The factor $K_{2x}$ is represented by a block 194. The signal thus obtained is subjected to limitation to a value of $\lambda_{xc\ max}$ by a limiter 196. The amount of this value is determined by a logic 198 in a manner to be described hereinbelow. At a summing point 200, the measured time derivative $\dot{\lambda}_x$ of the roll angle multiplied also by a factor $K_{2x}$ is superimposed with positive sign to the output of the limiter 196. This factor $K_{2x}$ is represented by a block 202. The difference multiplied by a factor $1/K_{Tx}$, which is represented by a block 204, provides the current $i_{Tx}$ for the actuator or torquer 34. The current $i_{Tx}$ is subjected to limitation by a limiter 206. The actuator or torquer 34 then generates a torque $T_x^s$ with a factor $K_{Tx}$. This is a torque exerted about the roll axis $x_s$ in the missile-fixed s-coordinate system. The factor $K_{Tx}$ is represented by a block 208.

The control loop 210 for the pitch axis 20 has a similar structure. The control loop 210 provides a torque $T_y^h$ about the pitch axis 20. The pitch axis 20 and the torque $T_y^h$ are defined in the h-coordinate system.

The limiting value $\lambda_{xc\ max}$, to which the limiter 196 limits the signals, is variable by the logic 198. The logic 198 makes a case discrimination and varies the limiting value in accordance with certain criteria.

The arrangement of FIG. 6 receives a vector $\omega_r^s$, which represents the angular rate of the seeker reference system in the missile-fixed s-coordinate system. If it is assumed, that because of the follow-up control loop (FIG. 4) the $x_r$-axis always remains aligned with the target or passes through the target, the vector $\omega_r^s$ represents the angular rate of the line of sight relative to the missile. Estimated values of the components of this vector appear at the outputs 136 and 138 of FIG. 4. This line of sight angular rate $\omega_r^s$ is compared with the angular rate $\omega_m$ of the missile in inertial space at a summing point 212, this missile angular rate having the components $p_m$, $q_m$ and $r_m$. The difference is a $\Delta\omega$. This difference is the line of sight angular rate relative to the missile. The absolute amount of the difference of the angular rates is formed. This is illustrated in FIG. 6 by a block 214. The absolute amount of the difference of the angular rates is filtered by a filter 216. The amount of this filtered absolute amount $|\Delta\omega|_F$ serves as a criterion for the logic 198.

A functional block 218 determines, from the directional cosine matrix $C_p^s$ applied to the input 180, the pitch angle $\lambda_{yr}$ of the pitch gimbal 18, when the seeker assembly is aligned with the seeker reference system. The amount of this pitch angle seves as a further criterion for the logic 198.

A third criterion is obtained from the target deviation $\epsilon_z$ normal to the pitch axis in the h-coordinate system. This target deviation $\epsilon_z$ is provided by the picture processing system 70.

In FIG. 6, the logic is schematically represented by switches, which are actuated by the various input quantities. A control signal is generated at an output 220 of the functional block 212. This control signal activates functional blocks 222, 224 or 226 through various switches controlled by the input quantities. The functional blocks 222, 224 and 226 determine the limiting values of the limiter 196.

The filtered absolute amount of the relative angular rate of the line of sight controls a switch 228 between two operative positions. The switch 228 is in its upper operative position, as viewed in FIG. 6, if the relative angular rate is smaller than an angular rate threshold of 60°. The switch 228 is in its lower operative position, if the relative angular rate is larger than the angular rate threshold of 60°.

The pitch angle $\lambda_{yr}$ controls a switch 230 between three operative positions: If the pitch angle is $\lambda_{yr}>5°$, i.e. is larger than an upper pitch angle threshold, the switch 230 is in its lower position, as viewed in FIG. 6. In this case, the control signal from output 220 is applied directly to the functional block 222. If the pitch angle is $\lambda_{yr}<0.050°$, i.e. is smaller than a lower threshold, then the switch 230 is in its median position in FIG. 6. In this case, the control signal from output 220 is applied directly to the functional block 224. Thereby this functional block is activated. If $$0.05°<\lambda_{yr}<5°,$$

thus the pitch angle lies between the lower and the upper pitch angle thresholds, then switch 230 is in its upper operative position, as viewed in FIG. 6. In this case, the contact arm of switch 230 is connected to the contact arm of switch 228 through a connection 232. In this case, the operative position of the switch 228 becomes important. In the lower position of the switch 228, the functional block 222 is activated through a connection 234. In the upper position of the switch 228, the control signal is applied to the contact arm of a further switch 238 through a connection 236.

The further switch 228 is controlled by the target deviation. The target deviation $\epsilon_z$ is applied to an input 240 of the operational diagram by the picture processing system. Also here the absolute amount $|\epsilon_z|$ of the target deviation is formed. This is illustrated by a block 242. The switch 238 can be switched into three operative positions. The switch is in a lower position, as viewed in FIG. 6, if the target deviation thus is smaller than a lower target deviation threshold. In this case, provided the switches 230 and 228 are in their upper positions, the control signal is applied to a functional block 224 through a connection 244. Thereby, the functional block 224 is activated. The switch is in its upper position, as viewed in FIG. 6, if the target deviation is $$|\epsilon_z|>1.4°,$$

thus the target deviation is larger than an upper target deviation threshold. In this case, the functional block 222 is activated through a connection 246, again provided that the switches 230 and 228 are in their upper positions. If, however, $$0.1°<|\epsilon_z|<1.4°,$$

thus the target deviation lies between the lower and the upper thresholds, then the switch 238 is in its median operative position. In this case, the functional block 226 is energized, provided the switches 230 and 228 are in their upper operative positions. Also the absolute amount of the target deviation is directly applied to the functional block 226 from functional block 242.

Functional block 222 limits the signals to the value of the maximum possible or admissible control rate of the roll actuator 38. When this functional block is activated, there is virtually no limitation of the roll control rate. Then the situation for the roll axis is substantially the same as for the pitch axis. When the functional block 224 is activated, the limiter value becomes $\lambda_{xc}$ max=0. No roll rate is commanded. The roll gimbal remains stationary in its position. When the functional block 226 is activated, the limiter value $\lambda_{xc\ max}$ varies in a range between the lower and upper target deviation thresholds progressively between zero and $\lambda_{x\ max}$.

The described logic operates as follows:

The follow-up of the seeker assembly 16 about the roll axis is effected in usual way, the positioning commands being limited only by the maximum control rate of the actuator 38, if the gimbal angle $\lambda_{yr}$ of the pitch axis 20 exceeds an upper threshold of, for example, 5°. In this case, the target is sufficiently spaced from the roll axis, thus lies outside the singularity. If the gimbal angle of the pitch angle 20 lies between the upper threshold and a lower threshold, the logic examines, whether the target moves fast or slowly relative to the missile. If there is a fast movement, i.e. if the absolute amount of the relative angular rate $|\Delta\omega|$ is larger than the angular rate threshold, also in this case the follow-up has to be effected in the usual way. The same is true in the case of large target deviation in the field of view of the seeker assembly 16. This counteracts the risk of target loss.

If, however, the gimbal angle of the pitch axis is smaller than a lower threshold of, for example, 0.05°, thus if the target is very close to the roll axis 24, then it is better to keep the roll angle unchanged. Then the risk of target loss, i.e. of the target moving out of the field of view of the seeker assembly 16, is low. The roll angle $\lambda_x$ is also left unchanged, if the commanded gimbal angle $\lambda_{yc}$ of the pitch axis is larger than the lower threshold but is smaller than the upper threshold, and if, at the same time, the absolute amount of the relative angular rate is small and the target deviation is small. In this case, the target is substantially in the center of the field of view of the seeker assembly, and the target moves rather slow relative to the missile. The gimbal angle $\lambda_{yc}$ of the pitch axis lies in a median range. Also here, the risk of target loss is low.

If, eventually, the commanded gimbal angle $\lambda_{yc}$ of the pitch axis 20 lies in the median range between the thresholds, the relative angular rate $|\Delta\omega|$ is low, and also the target deviation $\epsilon_z$ is in the median range between the lower and upper thresholds, then a positioning command about the roll axis 24 is generated which, in the range from the lower target deviation threshold to the upper target deviation threshold, depends on the target deviation in accordance with a progressive function. The function increases from zero to the maximum control rate.

A functional block 250 receives, at inputs 252 and 254, the commanded gimbal angles, namely the roll angle $\lambda_{xc}$ and the pitch angle $\lambda_{yc}$, from the functional block 178. Furthermore, the functional block 250 receives the relative angular rate $\Delta\omega$ of the line of sight, provided there is no critical state in the region of the singularity around the roll axis. This is indicated by a switch 256. Then the functional block 250 provides, at outputs 258 and 260, the time derivatives of the commanded gimbal angles $\lambda_{xc}$ and $\lambda_{yc}$. These time derivatives are applied to the control loop (at the bottom in FIG. 6).

While there are shown and described present preferred embodiments of the invention, it is to be distinctly understood that the invention is not limited thereto, but may be otherwise variously embodied and practiced within the scope of the following claims. Accordingly,

What we claim is:

1. A target tracking device for target tracking missiles comprising an electro-optical seeker assembly (16) mounted in a missile structure (10) through gimbals (18, 22), said seeker assembly responding to target radiation and providing target deviation signals, and actuator means (36, 38) for causing said seeker assembly (16) to track the target, said actuator means being controlled by said target deviation signals wherein:
   (a) said electro-optical seeker assembly (16) is pivotally mounted in said missile structure (10) about a roll axis (24) and a pitch axis (20) only, said pitch axis being orthogonal to said roll axis (24),
   (b) first and second pick-off means (28, 34) are provided for picking off angles of rotation of said seeker assembly (16) about said roll and pitch axes (24 and 20, respectively), said first and second pick-off means (28,34) providing pick-off signals,
   (c) structure-fixed inertial sensor means (48) are provided for measuring the angular rates about three mutually orthogonal axes and providing angular rate signals,
   (d) said target deviation signals from said seeker assembly (16), said pick-off signals from said pick-off means (28, 34) and said angular rate signals from said inertial sensor means (48) are applied to a computer (76), which is programmed to define a seeker reference system with three degrees of freedom, said seeker reference system being de-coupled from movements of the missile and the seeker assembly (16), having a roll movement which is zero, and which is caused to track a target detected by said seeker assembly (16), and
   (e) said computer (76), in addition, has means (80) for generating positioning commands for said actuator means (36, 38) depending on the position of said seeker reference system.

2. A device as claimed in claim 1, wherein said means (80) for generating said positioning command comprise case discriminating logic means (198) for selecting one of a plurality of specific positioning commands, when the target approaches said roll axis.

3. A seeker as claimed in claim 2, wherein
   (a) a first signal, which represents absolute amount of the angular rate of target relative to the missile, a second signal, which represents pitch angle, and a third signal, which represents the target deviation, are applied to said case discriminating logic means (198),
   (b) said case discriminating logic means (198) are arranged to combine said first, second and third signals such that
      the positioning command about said roll axis is limited only by the maximum control rate of said actuator means, if
      said pitch angle exceeds an upper threshold
      said pitch angle is larger than a lower threshold but smaller than said upper threshold and said absolute amount of relative angular rate is larger than an angular rate threshold, or
      said target deviation is larger than an upper target deviation threshold,
      said positioning command about said roll axis commands a control rate of zero, if
      said pitch angle is smaller than said lower pitch angle threshold,
      said pitch angle is larger than said lower pitch angle threshold and smaller than said upper pitch angle threshold, said absolute amount of the relative angular rate is smaller than said angular rate threshold, and the absolute amount of said target deviation is smaller than a lower target deviation threshold, and
      said positioning command about said roll axis increases as a function of said target deviation progressively within the range between said lower and upper target deviation thresholds, if
      said absolute amount of the relative angular rate is smaller than the angular rate threshold, and the absolute amount of the target deviation lies between said lower and upper target deviation thresholds.

* * * * *